July 3, 1956
G. J. AULTMAN
2,753,212
CLEANING APPARATUS
Filed Nov. 4, 1953
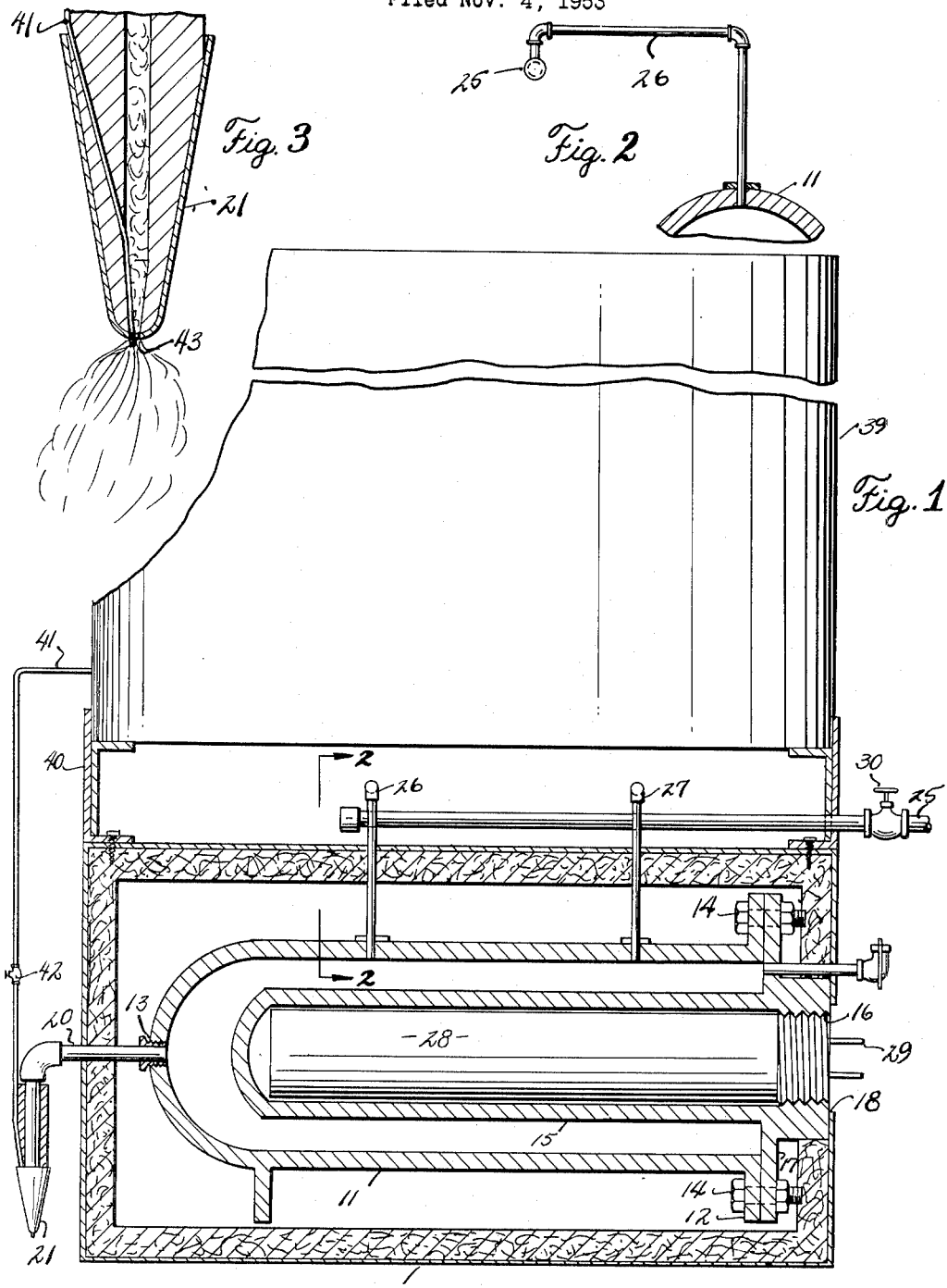
INVENTOR.
GEORGE J. AULTMAN
BY Bates Peare & McBean
ATTORNEYS United States Patent Office 2,753,212
Patented July 3, 1956

2,753,212

CLEANING APPARATUS

George J. Aultman, North Olmsted, Ohio

Application November 4, 1953, Serial No. 390,191

2 Claims. (Cl. 299—84)

This invention relates to a cleaning apparatus and more particularly to an apparatus for generating and supplying a combined jet of steam and a cleaning agent at an article to be cleaned.

Although there are many ways of cleaning soiled and dirty articles, certain of such articles because of their physical configuration and structural characteristics are most efficiently and economically cleaned by the application of steam to the article. Exemplary of the latter class of articles are relatively small items of jewelry and the like whose physical characteristics more readily lend themselves to cleaning by exposing them to a relatively high velocity jet of steam. In practice it is preferred that the steam be generated adjacent the article cleaning location and that the apparatus include a device for directing the steam jet at the article to be cleaned. One difficulty inherent in cleaning by steam in this manner resides in the fact that the jet of steam is relatively dry when it reaches the surface of the article and does not wet and clean the article surface sufficiently to satisfactorily accomplish the desired result.

Accordingly, it is a principal object of this invention to provide an apparatus for generating and supplying a combined jet of steam and a cleaning agent at the article surface.

Another object of this invention relates to an apparatus for combining a cleaning agent with a steam supply to provide a combined cleaning jet at an article surface.

A further object of this invention is the provision of a steam cleaning apparatus having a supply of water so disposed in relation to the steam generator as to substantially eliminate the residual collection of water in the generator during periods of non-use.

A still further object of this invention relates to the provision of a self-contained steam cleaning apparatus disposed in an insulated housing with all controls and connections accessible external to the casing.

The foregoing objectives are optimumly obtained by supplying water to a steam jacket which surrounds an encased electrical heating element adapted to flash the waer into steam. The steam jacket is enclosed in an insulated housing and the water is supplied from a valve controlled gravity system including a reservoir disposed above the housing. All controls and connections, including a restricted outlet in the form of a nozzle which is coupled to the steam jacket, are disposed external to the insulated housing. The system also includes a gravity supply of a cleaning agent disposed above the insulated housing and communicating with the steam supply at the nozzle to produce a combined cleaning jet for application at the article surface to be cleaned.

In the drawings:

Fig. 1 illustrates the cleaning apparatus with the steam generator shown in section and the cleaning fluid supply tank partially cut away;

Fig. 2 is a sectional view taken along the lines 2—2 in Fig. 1 to illustrate the physical disposition of the water supply reservoir in relation to the steam jacket; and Fig. 3 is an enlarged sectional view of a portion of the nozzle illustrating the intersection of the steam orifice with a restricted cleaning fluid orifice.

Referring now to Fig. 1 of the drawings, there is shown in section an insulating housing 10 which encloses a steam jacket 11. The steam jacket 11 is preferably in the form of a closed bell chamber having an open end with a laterally extending flange 12 and a threaded aperture 13 at the closed bell end. The jacket in turn surrounds a heater casing 15 which also is in the form of a bell chamber but of lesser diameter than the steam jacket. The heater casing 15 also has an open end 16 with a laterally extending flange 17 which, as shown in Fig. 1, acts as an end abutment for the flange 12 of the steam jacket. The flange 12 and the flange 17 are provided with aligned apertures through which connecting bolts and nuts designated generally at 14 may be assembled to secure the steam jacket against the abutment provided by the heater casing. The open end of the heater casing is seated against the adjacent wall of the insulated housing and communicates with the exterior through an aperture 18 in the casing wall. In the preferred form, both the steam jacket 11 and heater casing 15 are constructed from non-corrosive material such as aluminum or the like which has the added advantage of light weight. A conduit 20 communicates through the aperture 13 with the interior of the steam jacket 11 and extends outwardly through the adjacent housing wall where it is provided with a nozzle 21 having a configuration to be hereinafter more fully described.

Water is supplied through the valve controlled piping system 25 which is disposed above and external to the insulating housing. The pipe 25 acts as a gravity reservoir of water for the steam jacket 11 and is provided with take-off pipe connections 26 and 27 which extend through the top wall of the housing and communicate through the steam jacket wall to the interior of the jacket above the heater casing 15. A heater 28, which, as shown in Fig. 1, is in the form of an electrical heating element, may be inserted through the wall aperture 18 into the heater casing in such manner that the electrical connections 29 are exposed through the aperture 18 and external to the insulated housing, thus permitting the connection to be made without dismantling the housing or otherwise gaining access to the interior thereof.

As best shown in Fig. 2 of the drawings, the water supply system is arranged so that the supply pipe 25 forms a gravity reservoir disposed above the steam jacket 11 and displaced to the side thereof. The branch conduits 26 and 27 are coupled through elbows in the manner shown in Fig. 2 to provide a water supply path which includes a lift from the reservoir and a vertical drop into the steam jacket 11. With this arrangement, when the valve 30 is opened, water pressure is applied to the level of water in the reservoir portion of the pipe 25 which lifts the supply through the branch conduits 26 and 27 and into the steam jacket 11 for the generation of steam. When not in use, the valve 30 may be closed and the static level of the water in the reservoir section of the pipe 25 is not carried over to collect as residue in the steam jacket 11, thereby increasing the efficiency of the jacket and prolonging its useful life. The water when supplied through the branch conduits 26 and 27 drops on the heater casing 15 which has been heated by means of the heating element 28 to a relatively high temperature sufficient to flash the contacting water into steam vapor. The steam vapor pressure then is supplied through the conduit 20 to the cleaning nozzle 21 where it is released through a restricted opening at the extremity of the nozzle in the form of a relatively high velocity jet at the article surface to be cleaned.

I have found that water which is flashed into steam vapor in this manner may be too dry at times to wet and clean the article surface. Accordingly, this invention contemplates further the combination of a cleaning agent with the steam at the supply nozzle 21 to improve its cleaning characteristics. The cleaning agent preferably takes the form of a cleaning fluid, such as a detergent or the like, which improves the cleaning qualities of the steam jet.

In the preferred form shown in the drawings, the cleaning fluid is carried in a supply tank 39 which is mounted on a frame 40 directly above the self-contained steam generator so that the cleaning fluid may be supplied by gravity through the conduit 41 and shut-off valve 42 to the jet nozzle 21. The enlarged sectional view of the nozzle 21 shown in Fig. 3 of the drawings illustrates the manner in which the cleaning fluid conduit 41 intersects the steam path from the nozzle 21 just ahead of the restricted nozzle orifice 43 so that the cleaning fluid is introduced into the steam as its outward jet leaves the restricted orifice. The resultant cleaning jet embodies a mixture of relatively dry steam and a wetting agent in the form of a cleaning fluid which provides optimum cleaning results on the article surface to be cleaned.

Thus, there has been provided a cleaning method and apparatus including a self-contained steam generator having a gravity supply of water physically disposed to prevent the collection of a static level of water in the steam jacket and having all controls and connections external to the generator. The method and apparatus also includes a gravity supply of cleaning agent which preferably is in the form of a cleaning fluid that is combined at the supply nozzle with steam from the generator to supply a highly satisfactory cleaning jet at the article surface to be cleaned.

I have shown and described what I consider to be the preferred embodiment of my invention along with similar modified forms and suggestions and, it will be obvious to those skilled in the art, that other changes and modifications may be made without departing from the scope of my invention as defined by the appended claims.

I claim:

1. A self-contained steam generator comprising in combination, a heater having a water impervious surface adapted to be heated to a temperature sufficient to vaporize water, a steam jacket enclosing said heater and having an inlet and an outlet, said inlet being disposed above the heater and adapted to direct water onto the heater surface thereof, a closed water reservoir disposed above the jacket for gravity feed of water thereto, means for selectively supplying water to said reservoir, a conduit establishing communication from the top of said reservoir at a predetermined water level to the jacket inlet and coacting therebetween as a trap to isolate the jacket from the reservoir when the supply of water is removed and the static level of the water in the reservoir drops below said predetermined level, a nozzle having a restricted orifice coupled to said jacket outlet and adapted to form a relatively high velocity jet of steam, and means for independently introducing a fluid cleansing agent at the point of release of the steam from said nozzle.

2. A self-contained steam generator comprising in combination, an electrical heating element having electrical connections, a water impervious casing enclosing said heating element and adapted to be heated thereby to a water vaporization temperature, said casing having an opening providing access to the electrical connections of the heating element, a steam jacket enclosing said casing, an insulated housing enclosing said steam jacket and having an opening aligned with said casing openings, means for supporting the jacket and casing within the housing with the casing opening aligned with the housing opening, thereby providing access to the electrical connections of the heating element external to the housing, and means disposed external to said housing for selectively supplying water through the housing to the steam jacket and above the heater casing for vaporization upon contact with the heater casing.

References Cited in the file of this patent

UNITED STATES PATENTS

| | | |
|---|---|---|
| 212,710 | Kite | Feb. 25, 1879 |
| 695,330 | McCaslin | Mar. 11, 1902 |
| 995,132 | Griffing | June 13, 1911 |
| 1,533,268 | Reid | Apr. 14, 1925 |
| 1,825,131 | Shepherd | Sept. 29, 1931 |
| 1,835,283 | Crickmer | Dec. 8, 1931 |
| 1,916,806 | Myrick | July 4, 1933 |
| 2,151,354 | Osuch | Mar. 21, 1939 |
| 2,201,634 | Shurts | May 21, 1940 |
| 2,342,995 | Ballentine | Feb. 29, 1944 |
| 2,355,882 | Malsbary | Aug. 15, 1944 |
| 2,624,618 | Gelles | Jan. 6, 1953 |
| 2,646,585 | Whittington | July 28, 1953 |
| 2,664,902 | Campion | Jan. 5, 1954 |

FOREIGN PATENTS

| | | |
|---|---|---|
| 522,158 | France | Mar. 22, 1921 |
| 586,059 | Great Britain | Mar. 5, 1947 |